(12) United States Patent
Six

(10) Patent No.: US 7,715,394 B2
(45) Date of Patent: May 11, 2010

(54) ARCHITECTURE FOR BRIDGED ETHERNET RESIDENTIAL ACCESS NETWORKS

(75) Inventor: Erwin Alfons Constant Six, Kalken (BE)

(73) Assignee: ALCATEL, Paris (FR)

(*) Notice: Subject to any disclaimer, the term of this patent is extended or adjusted under 35 U.S.C. 154(b) by 1321 days.

(21) Appl. No.: 10/869,893

(22) Filed: Jun. 18, 2004

(65) Prior Publication Data
US 2004/0264458 A1    Dec. 30, 2004

(30) Foreign Application Priority Data
Jun. 25, 2003    (EP)    .................... 03291558

(51) Int. Cl.
*H04L 12/28* (2006.01)
*H04J 3/24* (2006.01)

(52) U.S. Cl. .................... 370/392; 370/475

(58) Field of Classification Search ................ 370/389, 370/390, 392, 393, 395.3, 419, 420, 431, 370/432, 464, 474, 475
See application file for complete search history.

(56) References Cited

U.S. PATENT DOCUMENTS

| | | | |
|---|---|---|---|
| 6,560,610 B1 * | 5/2003 | Eatherton et al. | 707/104.1 |
| 6,928,485 B1 * | 8/2005 | Krishnamurthy et al. | 709/242 |
| 7,099,295 B1 * | 8/2006 | Doyle et al. | 370/338 |
| 2002/0019933 A1 * | 2/2002 | Friedman et al. | 713/160 |
| 2002/0024964 A1 * | 2/2002 | Baum et al. | 370/419 |
| 2003/0172307 A1 * | 9/2003 | Henry et al. | 713/201 |
| 2003/0236916 A1 * | 12/2003 | Adcox et al. | 709/245 |
| 2004/0004967 A1 * | 1/2004 | Nakatsugawa et al. | 370/400 |
| 2004/0202199 A1 * | 10/2004 | Fischer et al. | 370/474 |
| 2004/0258003 A1 * | 12/2004 | Kokot et al. | 370/254 |

FOREIGN PATENT DOCUMENTS

| WO | WO 98/36608 | | 8/1998 |
|---|---|---|---|
| WO | WO98/36608 | * | 8/1998 |

* cited by examiner

*Primary Examiner*—Seema S Rao
*Assistant Examiner*—Christine Duong
(74) *Attorney, Agent, or Firm*—Sughrue Mion, PLLC

(57) ABSTRACT

The present invention is related to a method to forward an Ethernet packet in an Ethernet based access network. It comprises the step of receiving the Ethernet packet at a network access node being part of the access network and further the step of transforming at the network access node a first Ethernet MAC address contained in the Ethernet packet into a second Ethernet MAC address. Either the first or the second Ethernet MAC address comprises subscriber or subscriber line identification. Subsequently the step of continuing the communication protocol is performed.

18 Claims, 3 Drawing Sheets

ARCHITECTURE FOR BRIDGED ETHERNET RESIDENTIAL ACCESS NETWORKS

FIELD OF THE INVENTION

The present invention is related to an Ethernet based access network, wherein residential subscribers are coupled via an optional remote unit and an aggregation node and via Ethernet switches to an edge node.

STATE OF THE ART

The network access nodes in an Ethernet based access network, i.e. remote unit and aggregation node, connect the residential users to the network of the Network Access Provider (NAP). The remote units are the first gate from the user towards the NAP e.g. VDSL terminators. As a remote unit only connects a few users, it needs to be very cost effective. The aggregation node aggregates a number of remote units and bears more functionality because their cost is shared among more subscribers. The network edge nodes connect the Layer 2 Ethernet network of the NAP to the Layer 2 network of the Network Service Providers NSP, or connects the Layer 2 network via an IP point to the IP-network of the NAP. Ethernet bridges are used to interconnect all these network devices.

Ethernet access networks in a bridged configuration are very attractive for this access architecture because of their management-less self-learning capabilities, flexibility and efficient support for multicast services. A major problem they encounter is that one can never derive from the packet which subscriber line it belongs to. This poses severe problems with respect to security, subscriber management and, indirectly, to cost.

In order to solve the above-mentioned problem bridged Ethernet networks are deployed in a Cross-Connect configuration. On top of the normal Ethernet a pipe model is constructed. All traffic from one subscriber is put inside a pipe. Pipe architectures based on Virtual LANs (VLANs) and MPLSoE (MultiProtocol Label Switching over Ethernet) have been proposed. Standardisation efforts on both types of solutions are ongoing.

Cross-connect networks are very well suited for business deployment but are less flexible, need more management and have problems with multicast traffic. All this is due to the pipe model, which is on top. Therefore they are not suited for residential access.

AIMS OF THE INVENTION

The present invention aims to disclose a bridged Ethernet network architecture for residential access that overcomes the drawbacks of the state of the art solutions.

SUMMARY OF THE INVENTION

The invention relates to a method to forward an Ethernet packet in an Ethernet based access network, comprising the step of receiving said Ethernet packet at a network access node being part of said access network. It further comprises the step of transforming at the network access node a first Ethernet MAC address contained in the Ethernet packet into a second Ethernet MAC address, whereby either the first or the second Ethernet MAC address comprises subscriber or subscriber line identification. Subsequently the step of continuing the communication protocol is performed.

The Ethernet MAC address comprising subscriber or subscriber line identification has preferably a format comprising:
  A user device identification, being the Ethernet device number of the device on the bus,
  A subscriber line identification, being a line number of the bus at a remote unit,
  A remote unit identification, being a remote number of said remote unit itself, and
  A metro edge identification, being the hub number of the aggregation node.

Advantageously the subscriber or subscriber line identification allows the retrieval of information regarding the origin of the Ethernet packet.

In an advantageous embodiment the first Ethernet MAC address is an Ethernet source MAC address of an upstream Ethernet frame to be transformed into the second Ethernet MAC address comprising subscriber or subscriber line identification.

In an alternative embodiment the first Ethernet MAC address comprises subscriber or subscriber line identification to be transformed into a second Ethernet MAC address, whereby the second Ethernet MAC address is an Ethernet unicast destination MAC address of a downstream Ethernet frame.

Optionally the Ethernet MAC address comprising subscriber or subscriber line identification also contains a netmask comprising the netmask length. The netmask splits the Ethernet MAC address in a network related part and a device related part.

Typically the network access node is a remote unit or an aggregation node.

In yet another embodiment the method disclosed in the invention comprises—after the step of receiving the Ethernet packet at a network access node being part of the access network—the further step of transforming a first Ethernet MAC address contained in the Ethernet packet into a second Ethernet MAC address, whereby the first Ethernet MAC address is a broadcast Ethernet destination MAC address of an upstream Ethernet frame and the second Ethernet MAC address is a multicast-group address.

In this embodiment part of the Ethernet packet advantageously is 1-to-1 mapped with the said multicast address. The part of the Ethernet packet to be 1-to-1 mapped with the multicast address preferably comprises protocol information.

In an alternative embodiment the step of transforming is replaced by step of encapsulating the Ethernet packet with the first Ethernet MAC address in a new packet comprising the second Ethernet MAC address. The step of transforming can also be replaced by the step of applying a MAC address translation, wherein the first Ethernet MAC address is overwritten with the second Ethernet MAC address.

As a second object the invention relates to an electrical circuit device arranged to carry out the method as in any of the previous claims.

As a third object the invention relates to a network access node arranged for receiving an Ethernet packet in an Ethernet based access network, wherein the access node is further arranged for transforming a first Ethernet MAC address contained in the Ethernet packet into a second Ethernet MAC address, whereby either the first or the second Ethernet MAC address comprises subscriber or subscriber line identification.

The invention also relates to a 48 bit Ethernet MAC address format, with the following parts:
  A fixed two bit part,
  A user device identification, being the Ethernet device number of the device on the bus, A subscriber line identification, being a line number of the bus at remote unit, A remote unit identification, being a remote number of said remote unit itself, A metro edge identification, being the hub number of the aggregation node, and A part that can be used to indicate a netmask and its length.

In a preferred embodiment the metro edge identification starts with a zero bit, indicating an access node. To indicate an edge node the metro edge identification starts with a one bit.

In yet another object the invention relates to an Ethernet packet comprising a MAC address in the following format:

A fixed two bit part,

A user device identification, being the Ethernet device number of the device on the bus, A subscriber line identification, being a line number of the bus at remote unit, A remote unit identification, being a remote number of said remote unit itself, A metro edge identification, being the hub number of the aggregation node, and A part that can be used to indicate a netmask and its length.

SHORT DESCRIPTION OF THE DRAWINGS

DETAILED DESCRIPTION OF THE INVENTION

Figure 1:
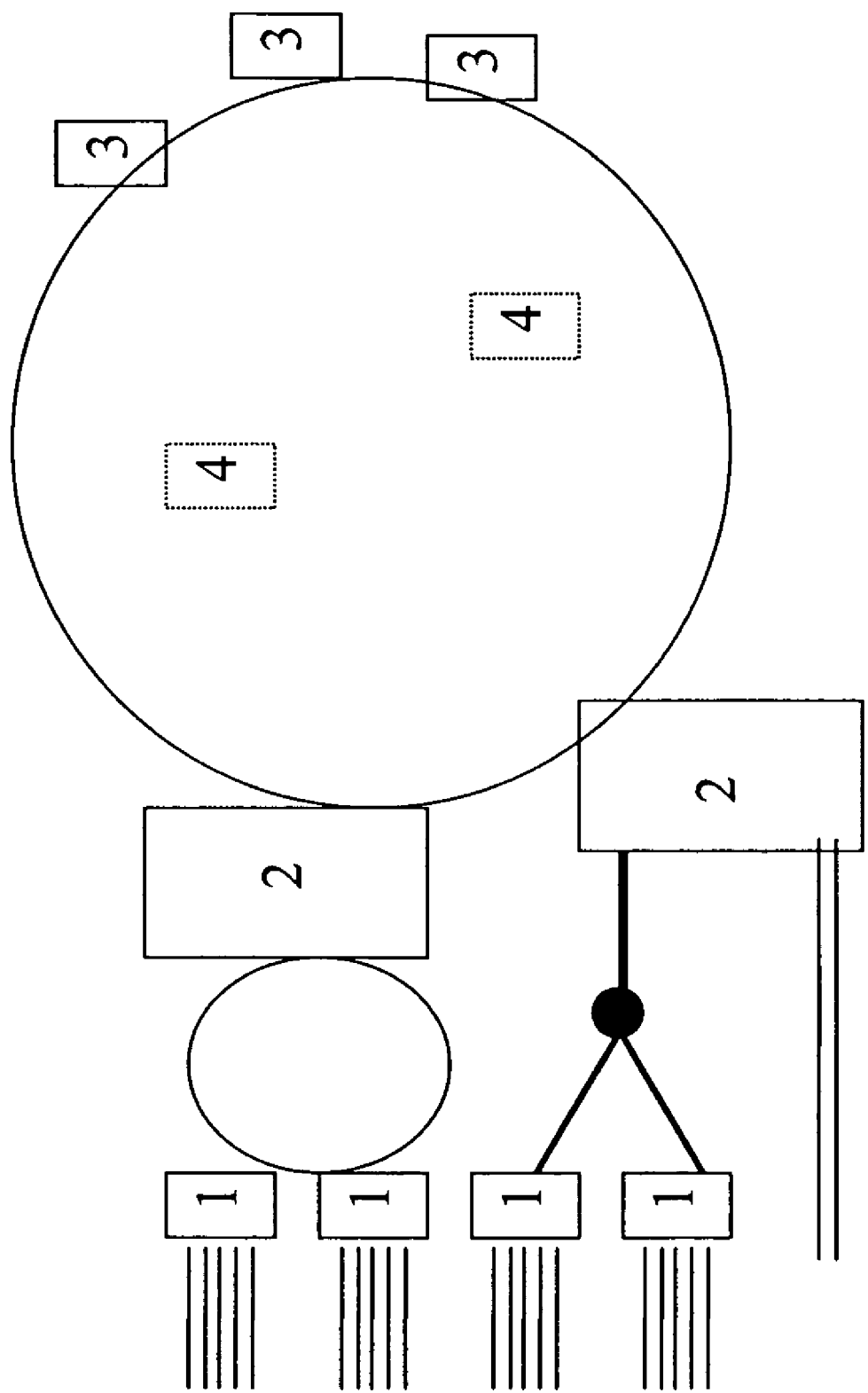
FIG. 1 represents the assumed access network.

FIG. 1 illustrates the assumed Ethernet based access network. The network access nodes, i.e. remote unit (1) and aggregation node (2), connect the residential users to the network of the Network Access Provider (NAP). The aggregation node aggregates a number of remote units. The network edge nodes (3) connect the Layer 2 Ethernet network of the NAP to the network of the Network Service Providers NSP, or connects the Layer 2 network via an IP point to the IP-network of the NAP. Ethernet bridges (4) are used to interconnect all these network devices.

The optimal solution to the state-of-the-art problems would be a bridged Ethernet network without pipes, wherein the Network Access Provider has direct associations between a packet and a subscriber line.

Key to the disclosed invention is therefore the introduction at the network access nodes, i.e. remote units and aggregation nodes, of a new predefined Ethernet MAC address structure comprising an explicit subscriber line identification. The goal to be achieved is to allow the retrieval of all useful information related to a packet from just this MAC address. Packets coming in upstream will undergo a source MAC address transformation, whereas the destination MAC address will not change. In downstream the destination MAC address will undergo the inverse transformation. This enables user-segregation and information retrieval inside every packet, yielding a better security and rendering more cost-effective most user-management deeper in the network.

Wherever Ethernet address translation is mentioned in this description, MAC-in-MAC can also be used: if e.g. a packet is coming from the user, either the old MAC address can be overwritten with the new address structure (MAC address translation), or the packet with the old address can be encapsulated in a new packet with the same destination address but with a new source address.

In a first embodiment of the invention an Ethernet MAC Address Translation (EMAT) is performed in the Network Access node whereby the user's unicast MAC addresses are transformed into a special form of the Ethernet unicast MAC address. A newly defined 48-bit address, split into different parts, will be discussed below. So the source address of the upstream frames are transformed in order to incorporate subscriber line information. With respect to the destination address it must be noted unicast destination addresses are not transformed in upstream. In another embodiment downstream packets are considered. There it is the unicast destination address that undergoes the inverse address transformation, i.e. an Ethernet address in said special form is transformed back into its original format. The source address remains as is.

Broadcast destination addresses however also cause some problems. Therefore these addresses may be transformed too. This constitutes a third embodiment of the invention. In order to reduce broadcast traffic, the invention proposes to translate the upstream destination addresses, which are equal to the broadcast address, to a multicast-group address. These addresses are only broadcast to members, which have registered them to receive it. Note that in downstream nothing happens with destination broadcast addresses.

A Broadcast Ethernet MAC Addresses translation to Ethernet multicast-group addresses is performed at the Network Access node, whereby a control of broadcast storms is reached. Broadcast storms are a potential threat to bridged Ethernet networks because the packets will be duplicated inside every Ethernet bridge on all interfaces, which creates overload inside the aggregation network and potentially a Denial of Service (DoS) attack. By applying a 1-to-1 mapping between a protocol identifier, present in the upstream packet, e.g. Ethernet-Type (or higher layer IP/TCP information) fields, and a multicast-group address, edge points will be able to advertise their interest in receiving broadcast messages of a certain protocol type, via the known Ethernet GMRP protocol. This reduces the broadcasts to only those devices that need them. If no edge device has registered its interest, the multicast packet will be discarded in the first Metro switch.

Optionally, an IP netmask concept is used by the Ethernet switches in order to minimise the learning tables and to reduce drastically the flooding problems. The netmask splits the Ethernet MAC address in a network related part and a device related part. Due to the fact that all upstream packets carry a transformed source address which incorporates information on the origin of the packet (e.g. Access Node, remote Unit, Line, . . . information), this transformed Ethernet MAC address will have a hierarchical structure (which was not the case for a globally unique address). Therefore, all upstream packets coming from a single access node will carry a common field inside the Ethernet address, which will be called the network part of the address. In normal operation Ethernet switches inside the aggregation network will learn all MAC addresses of all subscriber devices. Due to the fact that potentially millions of devices are attached to this network, all switches will need to learn millions of addresses in order to know to which interface packets needs to be forwarded. As all packets of a certain access node with the same common network part will always be forwarded via the same path, only 1 entry could be enough to forward the frames. This entry then will only learn and forward based on the common part of the MAC address. This optional functionality will need a small change inside normal Ethernet switches, but will reduce memory (and accordingly cost) for the switching tables. Additionally, this mechanism will make the learning of the aggregation network converge much faster (reduced flooding) because only one frame from a certain access node needs to be learned, instead of one frame for each attached Ethernet device.

Generally speaking there are 2 types of devices inside the access network:
- Devices that are trusted Ethernet end-points, such as edge nodes, and that belong to the NAP or NSP. These edge devices will normally have a globally unique Ethernet address (bit48=0, bit47=0), but this address might also be configurable, and
- Devices attached to the network by customers. These devices are not trusted and will always have a globally unique address (bit48=0; bit47=0).

Said globally unique Ethernet MAC addresses usually have a structure containing a vendor ID and a random device number.

The general idea is that every source address becomes a trusted MAC address and by just looking at this trusted new addresses one knows where a packet is coming from/going to. In order to quickly detect whether a packet is going upstream (from the access nodes towards the edge nodes) or downstream (from the edge nodes towards the access nodes), a separate range of source MAC addresses is specified uniquely for the access nodes and uniquely for the edge nodes. When this split is made, every intermediate switch will be able to detect by looking at both the source and the destination address, what type of packet it is: e.g. every packet coming from a customer receives a MAC address from a first range of addresses and every edge node is configured with a MAC address from a second range. If an intermediate switch looks at both the source and destination address (SA and DA, respectively) it can conclude the following:
- SA=Range1, DA=Range2: Upstream packet
- SA=Range2, DA=Range1: Downstream packet
- SA=Range1, DA=Range1: User-to-user talk (Operators might want to discard this)
- SA=Range2, DA=Range2: Edge-to-edge talk (Operators might want to discard this).

Therefore the range of the newly defined addresses should be split up in 2 main parts. The first main part is to be used by the access nodes in order to translate the MAC addresses coming from a user (in case of upstream). This part can consist of some sub-parts. The second main part is used by the edge points in order to indicate which edge node was passed (in case of downstream).

Figure 2:
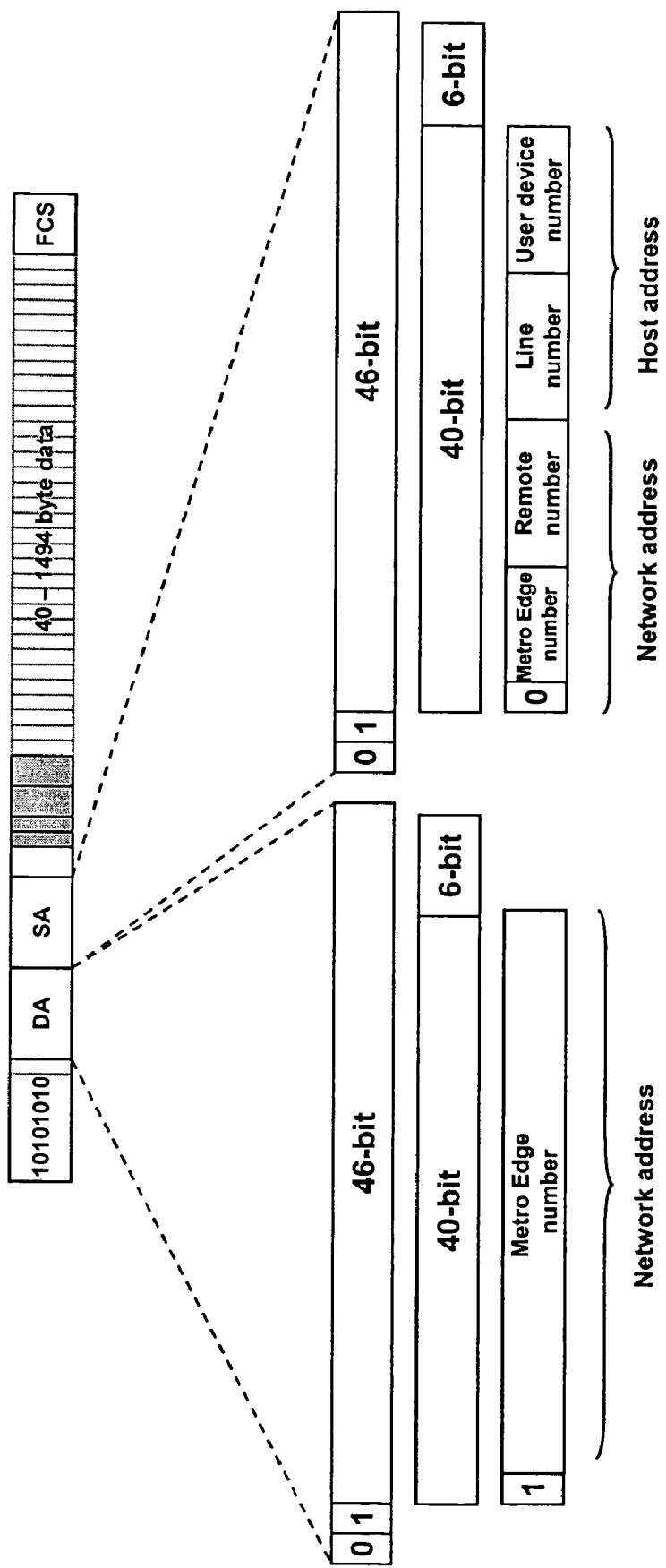
FIG. 2 represents the new predefined Ethernet MAC address structure for an upstream Ethernet packet.

The different parts of the newly defined MAC address as shown in FIG. 2 are now described.

a) a fixed part containing two bits b) 40 bits with 4 variable parts:
- a Metro edge address part i.e. HUB number identifying the aggregation node;
- a Remote unit address part i.e. Remote Number identifying the remote unit itself;
- a Subscriber line address part i.e. Line Number identifying the bus at the remote unit;
- a User device address part i.e. Ethernet Device number identifying the device on the bus;

c) (optional) a Netmask of 6 bit comprising the netmask length.

Figure 3:
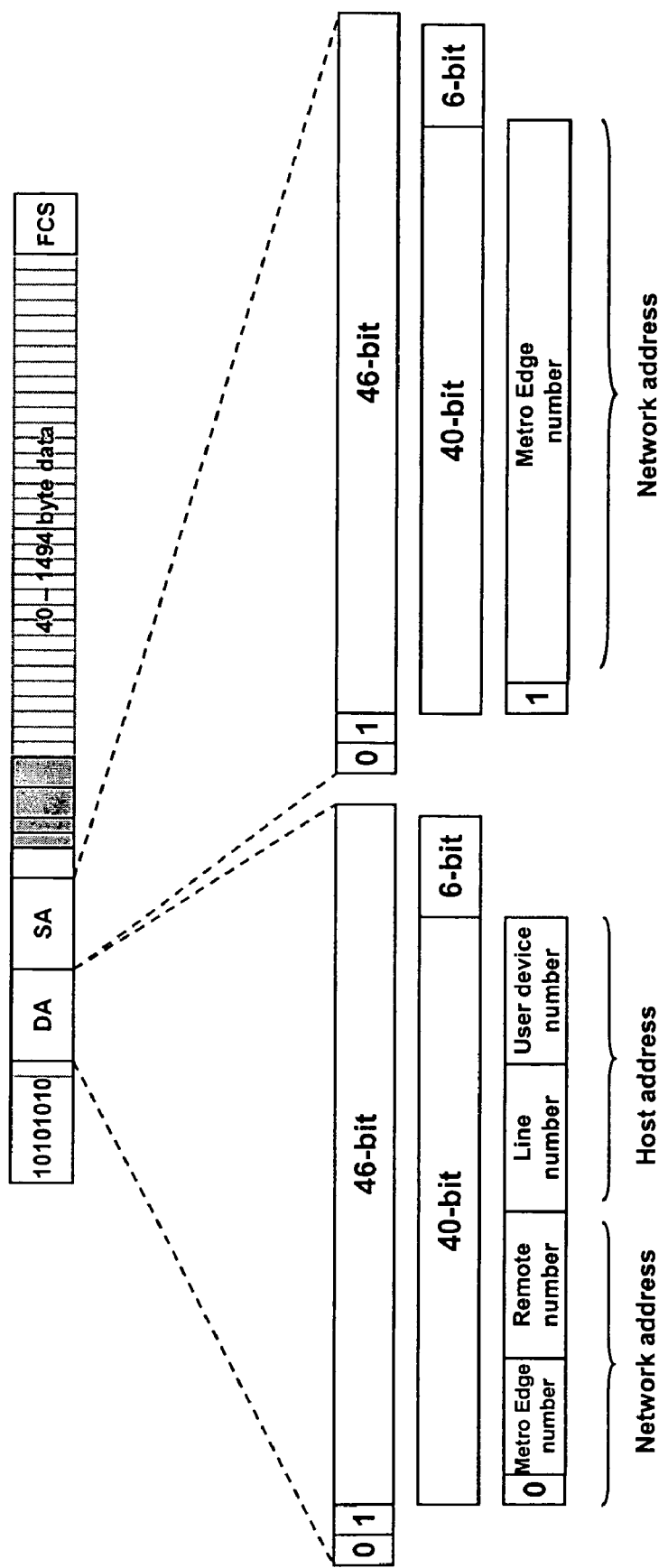
FIG. 3 represents the new predefined Ethernet MAC address structure for a downstream Ethernet packet.

The Metro edge address part forms the second main part, whereas the Remote unit address part, the Subscriber line address part and the User device address part make up the first main part. FIGS. 2 and 3 represent the new Ethernet MAC address structure for upstream and downstream, respectively.

Packets coming from a user device can e.g. have their MAC address translated into an address with fixed two bit part bit48=0 (unicast) and bit47=1 (Locally managed). For edge device (Broadband RAS) with, as already mentioned, always a globally unique address (bit48=0; bit47=0), it is possible to also use the bit48=0 and bit 47=1 fixed part and to configure this address manually in the trusted IP edge devices. Note that for the edge nodes the parts of remote unit, subscriber line and device information have no meaning. So for edge nodes there is no real structure, the address should just be easy to distinguish from the translated addresses. If all subscriber addresses are transformed, all addresses can be used except those already used for the transformation.

Two kinds of new Metro edge addresses are therefore defined:
- one starting with 0 for transformed addresses with the fixed structure, indicating an Access Node (=MAC address starting with 010) (=upstream), and
- one starting with 1, indicating an Edge Node (=MAC address starting with 011) (=downstream).

This allows to distinguish upstream packets from downstream packets and to prevent hereby user-to-user communication. The split makes it possible to have $2^{39}$ user devices.

It will be clear to a person skilled in the art that the methods of the invention as described above, can be implemented in an electrical circuit.

The advantages the invention offers are manifold. The new architecture creates the possibility of using all advantages of a normal bridged network, but makes it possible to deploy these networks for residential access by improving the security, privacy, scalability, stability, manageability and cost of these networks.

Security & Privacy are improved:
- due to Ethernet MAC Address uniqueness and prevention of spoofing
- by prevention of user-to-user communication (via available subscriber information)

Scalability & stability are enhanced:
- due to the control over broadcast storms (via multicast translation)
- by reduction of the flooding problem (via efficient learning of MAC@ via netmask)
- by reducing learning tables for forwarding (via efficient learning of MAC@ via netmask)

Manageability and, indirectly, cost are improved by:
- optimal use of self-learning (because a secure, scalable and stable bridged network is obtained) and by
- cost-effective user management (via available subscriber information)

On top it gives the freedom to still use the VLAN/VMAN concepts for other purposes:
- support the ongoing standardisation architectures for business users (VMAN/VLAN)
- use VLANs for QoS purposes
- use VLANs for network protection

The invention claimed is:

1. A method of forwarding an Ethernet packet in an Ethernet based access network, comprising:
   - the step of receiving said Ethernet packet at a network access node being part of said access network, characterised in that it further comprises the step of transforming at said network access node a first Ethernet MAC address contained in said Ethernet packet into a second Ethernet MAC address, whereby either said first or said second Ethernet MAC address comprises subscriber line identification and subsequently the step of continuing a communication protocol;
whereby either said first or said second Ethernet MAC address comprising subscriber line identification also contains a netmask comprising a netmask length, said netmask splitting said either first or second Ethernet MAC address in a network related part and a device related part.

2. The method according to claim 1, characterised in that said Ethernet MAC address comprising subscriber line identification has a format comprising:
a user device identification, being an Ethernet device number of the device on a bus,
a subscriber line identification, being a line number of the bus at a remote unit,
a remote unit identification, being a remote number of said remote unit itself,
a metro edge identification, being a hub number of an aggregation node.

3. The method according to claim 1 or 2, characterised in that said subscriber line identification allows to retrieve information regarding an origin of said Ethernet packet.

4. The method according to claim 2, characterised in that said first Ethernet MAC address is an Ethernet source MAC address of an upstream Ethernet frame to be transformed into said second Ethernet MAC address comprising subscriber line identification.

5. The method according to claim 2, characterised in that said first Ethernet MAC address comprises subscriber line identification to be transformed into said Ethernet MAC address, said second Ethernet MAC address being an Ethernet unicast destination MAC address of a downstream Ethernet frame.

6. The method according to claim 1, characterised in that said network access node is a remote unit or an aggregation node.

7. Method to forward an Ethernet packet in an Ethernet based access network, comprising:
the step of receiving said Ethernet packet at a network access node being part of said access network, characterised in that it further comprises the step of transforming at said network access node a first Ethernet MAC address contained in said Ethernet packet into a second Ethernet MAC address, whereby said first Ethernet MAC address is a broadcast Ethernet destination MAC address of an upstream Ethernet frame and said second Ethernet MAC address is a multicast-group address, and
wherein part of said Ethernet packet is 1-to-1 mapped with said multicast address.

8. The method according to claim 7, wherein said part of said Ethernet packet to be 1-to-1 mapped with said multicast address, comprises protocol information.

9. The method according to claim 7, wherein the step of transforming is replaced by step of encapsulating said Ethernet packet with said first Ethernet MAC address in a new packet comprising said second Ethernet MAC address.

10. The method according to claim 7, wherein the step of transforming is replaced by a step of applying a MAC address translation, wherein said first Ethernet MAC address is overwritten with said second Ethernet MAC address.

11. An electrical circuit device arranged to carry out the method of claim 7.

12. A network access node arranged for receiving an Ethernet packet in an Ethernet based access network characterised in that said network access node is further arranged for transforming a first Ethernet MAC address contained in said Ethernet packet into a second Ethernet MAC address, whereby either said first or said second Ethernet MAC address comprises subscriber line identification,
wherein the subscriber line identification comprises a line number of a bus at a remote unit, and
wherein one of said first Ethernet MAC address and said second Ethernet MAC address is split into a network related part and a device related part.

13. A method of transforming a first 48 bit Ethernet MAC address into a second 48 bit Ethernet MAC address format, characterised in that the first 48 bit Ethernet MAC address or the second Ethernet MAC address comprises the following parts:
a fixed two bit part,
a user device identification, being an Ethernet device number of the device on a bus,
a subscriber line identification, being a line number of the bus at a remote unit,
a remote unit identification, being a remote number of said remote unit itself,
a metro edge identification, being a hub number of an aggregation node,
a part that is used to indicate a netmask and its length;
wherein the transforming transforms a source address of an upstream Ethernet packet; and
transmitting the upstream Ethernet packet.

14. The method of claim 13, characterised in that said metro edge identification starts with a zero bit, indicating an access node.

15. The method of claim 14, characterised in that said metro edge identification starts with a one bit, indicating an edge node.

16. A method of transforming a first Ethernet packet into a second Ethernet packet characterised in that the first or the second Ethernet packet comprising a MAC address in the following format:
a fixed two bit part,
a user device identification, being an Ethernet device number of the device on a bus,
a subscriber line identification, being a line number of the bus at a remote unit,
a remote unit identification, being a remote number of said remote unit itself,
a metro edge identification, being a hub number of an aggregation node,
a part that is used to indicate a netmask and its length;
wherein the transforming transforms a source address of an upstream Ethernet packet; and
transmitting the upstream Ethernet packet.

17. A method of transforming a first 48 bit Ethernet MAC address into a second 48 bit Ethernet MAC address format, characterised in that the first 48 bit Ethernet MAC address or the second Ethernet MAC address comprises the following parts:
a fixed two bit part,
a user device identification, being an Ethernet device number of the device on a bus,
a subscriber line identification, being a line number of the bus at a remote unit,
a remote unit identification, being a remote number of said remote unit itself,
a metro edge identification, being a hub number of an aggregation node,
a part that is used to indicate a netmask and its length;

wherein the transforming transforms a destination address of a downstream Ethernet packet; and transmitting the downstream Ethernet packet.

18. A method of transforming a first Ethernet packet into a second Ethernet packet characterised in that the first or the second Ethernet packet comprising a MAC address in the following format:

a fixed two bit part, a user device identification, being an Ethernet device number of the device on a bus;

a subscriber line identification, being a line number of the bus at a remote unit, a remote unit identification, being a remote number of said remote unit itself, a metro edge identification, being a hub number of an aggregation node, a part that is used to indicate a netmask and its length;

wherein the transforming transforms a destination address of a downstream Ethernet packet; and transmitting the downstream Ethernet packet.

* * * * *